United States Patent
Zhang et al.

(10) Patent No.: US 9,892,541 B2
(45) Date of Patent: Feb. 13, 2018

(54) METHODS FOR A PROGRAMMABLE PRIMITIVE SETUP IN A 3D GRAPHICS PIPELINE AND APPARATUSES USING THE SAME

(71) Applicant: VIA Alliance Semiconductor Co., Ltd., Shanghai (CN)

(72) Inventors: Huaisheng Zhang, Shanghai (CN); Zhou Hong, Cupertino, CA (US); Xiaowei Yao, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 229 days.

(21) Appl. No.: 14/919,799

(22) Filed: Oct. 22, 2015

(65) Prior Publication Data
US 2017/0053429 A1 Feb. 23, 2017

(30) Foreign Application Priority Data

Aug. 19, 2015 (CN) .......................... 2015 1 0511346

(51) Int. Cl.
*G06T 15/00* (2011.01)
*G06T 1/20* (2006.01)

(52) U.S. Cl.
CPC .............. *G06T 15/005* (2013.01); *G06T 1/20* (2013.01)

(58) Field of Classification Search
CPC ................................ G06T 15/005; G06T 1/20
See application file for complete search history.

(56) References Cited

U.S. PATENT DOCUMENTS

| 6,052,129 | A | 4/2000 | Fowler et al. | |
|---|---|---|---|---|
| 6,359,630 | B1* | 3/2002 | Morse | G06T 15/30 345/620 |
| 7,257,814 | B1* | 8/2007 | Melvin | G06F 9/3004 710/200 |
| 8,599,202 | B1* | 12/2013 | Legakis | G06T 15/005 345/423 |
| 8,643,659 | B1* | 2/2014 | Baldwin | G06T 1/60 345/557 |
| 8,681,162 | B2 | 3/2014 | Paltashev et al. | |
| 2005/0030320 | A1* | 2/2005 | Munshi | G06T 11/40 345/620 |
| 2007/0165035 | A1* | 7/2007 | Duluk, Jr. | G06T 1/60 345/506 |
| 2007/0291044 | A1* | 12/2007 | Xu | G06T 11/001 345/582 |

(Continued)

FOREIGN PATENT DOCUMENTS

| TW | I474280 | 11/2011 |
|---|---|---|
| TW | 201216200 | 4/2012 |

*Primary Examiner* — William A Beutel
(74) *Attorney, Agent, or Firm* — McClure, Qualey & Rodack, LLP (57) ABSTRACT

A method for a programmable primitive setup in a 3D graphics pipeline is introduced to contain at least the following steps. Information about first and third primitives is obtained from a buffer. The information about all or a portion of the first primitives is packed and sent to an SS (Setup Shader) thread. Information about a second primitive to be clipped is packed and sent to a GBS (Guard-Band-clipping Shader) thread. The information about all or a portion of the third primitives is packed and sent to an AS (Attribute Shader) thread.

18 Claims, 10 Drawing Sheets

(56) References Cited

U.S. PATENT DOCUMENTS

| | | | | |
|---|---|---|---|---|
| 2008/0074430 A1* | 3/2008 | Jiao | ............ | G06T 15/005 |
| | | | | 345/506 |
| 2010/0201703 A1* | 8/2010 | Jiao | ............ | G11B 7/0065 |
| | | | | 345/589 |
| 2011/0043518 A1* | 2/2011 | Von Borries | ............ | G06T 11/40 |
| | | | | 345/419 |
| 2012/0092353 A1* | 4/2012 | Paltashev | ............ | G06T 9/00 |
| | | | | 345/522 |
| 2013/0021360 A1* | 1/2013 | Gruber | ............ | G06F 9/52 |
| | | | | 345/589 |
| 2013/0063459 A1* | 3/2013 | Schneider | ............ | G06F 9/4443 |
| | | | | 345/581 |
| 2015/0130798 A1* | 5/2015 | Heggelund | ............ | G06T 7/62 |
| | | | | 345/420 |
| 2015/0317338 A1* | 11/2015 | Radovic | ............ | G06F 17/30985 |
| | | | | 707/695 |
| 2017/0206706 A1* | 7/2017 | Barber | ............ | G06T 17/20 |

\* cited by examiner

METHODS FOR A PROGRAMMABLE PRIMITIVE SETUP IN A 3D GRAPHICS PIPELINE AND APPARATUSES USING THE SAME

CROSS REFERENCE TO RELATED APPLICATIONS

This application claims the benefit of China Patent Application No. 201510511346.2, filed on Aug. 19, 2015, the entirety of which is incorporated by reference herein.

BACKGROUND

Technical Field

The present invention relates to 3D (three-dimensional) graphics processing, and in particular, it relates to methods for a programmable primitive setup in a 3D graphics pipeline and apparatuses using the same.

Description of the Related Art

Primitives, including triangles, lines and points, are required to set up their topology and attribute functions in a 3D (three-dimensional) hardware pipeline, and then they are rastered into tiles based on the topology functions, and the final colors are computed in the pixel shader based on the attribute functions. Normally, the primitive setup stages are handled by the hardware FIX (fixed) module. However, the traditional FIX module consumes excessive gate-count costs to realize the primitive setup operations. Furthermore, it is inconvenient to correct newly discovered errors after the chip is tape-out. The new bugs cannot be fixed and the new features cannot be added by engineers if the chip is ready. Thus, methods for a programmable primitive setup in a 3D graphics pipeline and apparatuses using the same are introduced to overcome the drawbacks.

BRIEF SUMMARY

An embodiment of a method for a programmable primitive setup in a 3D graphics pipeline is introduced to contain at least the following steps. Information about first and third primitives is obtained from a buffer. The information about all or a portion of the first primitives is packed and sent to an SS (Setup Shader) thread, enabling the SS thread being executed to output the information about the first primitives to a SP (Stream Processor) for constructing a primitive topology in parallel. Information about a second primitive to be clipped is packed and sent to a GBS (Guard-Band-clipping Shader) thread, enabling the GBS thread being executed to output the information about the second primitive to the SP for clipping the second primitives. The information about all or a portion of the third primitives is packed and sent to an AS (Attribute Shader) thread, enabling the AS thread being executed to output the information about the third primitives to the SP for executing an attribute function in parallel.

An embodiment of an apparatus for programmable primitive setup in 3D graphics pipeline contains at least a buffer, a SP, a SSTC (Setup Shader Thread Constructor), a GBTC (Guard-Band-clipping shader Thread Constructor) and an ASTC (Attribute Shader Thread Constructor). The SSTC obtains information about first primitives from the buffer, and packs and sends the information about all or a portion of the first primitives to an SS thread, enabling the SS thread being executed to output the information about the first primitives to the SP for constructing a primitive topology in parallel. The GBTC packs and sends information about a second primitive to be clipped to a GBS thread, enabling the GBS thread being executed to output the information about the second primitive to the SP for clipping the second primitives. The ASTC obtains information about third primitives from the buffer, and packs and sends the information about all or a portion of the third primitives to an AS thread, enabling the AS thread being executed to output the information about the third primitives to the SP for executing an attribute function in parallel.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
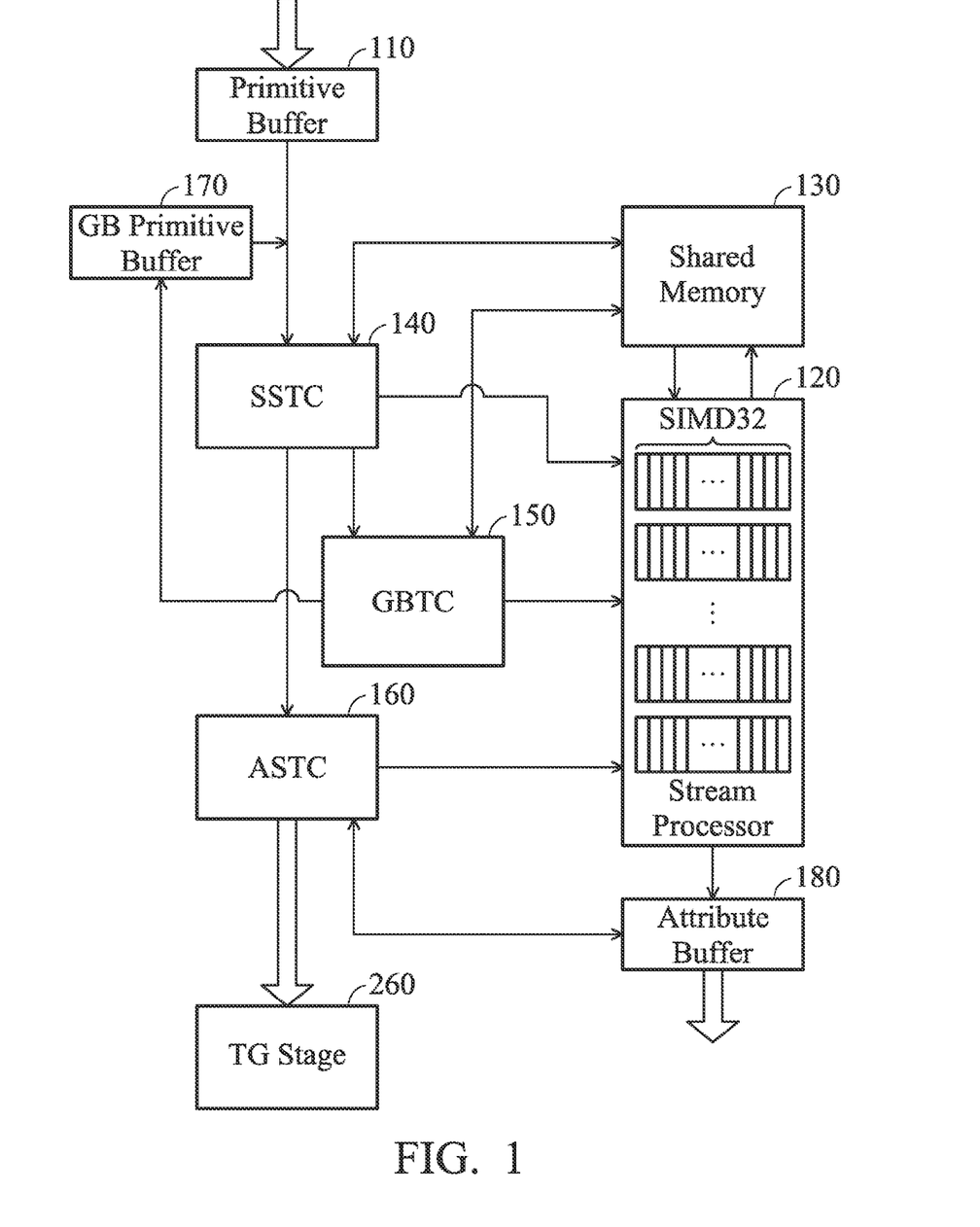
FIG. 1 is the hardware architecture of the 3D (three-dimensional) graphics processing apparatus according to an embodiment of the invention.

FIG. 1 is the hardware architecture of the 3D (three-dimensional) graphics processing apparatus according to an embodiment of the invention. The SSTC (Setup Shader Thread Constructor) 140 reads information about primitives from the primitive buffer 110 or the GB (Guard-Band-clipping) primitive buffer 170, packs and sends the primitive information to the SS (Setup Shader) thread, enabling the SS thread being executed to output the primitive information to the SP (Stream Processor) 120 for constructing the primitive topology in parallel. The SSTC 140 requests an allocation of memory space to the shared memory 130 for each primitive, enabling the SP 120 to output the computation results to the shared memory 130. When the SS thread being executed discovers that any primitive needs to perform the guard-band clipping, the GBTC (Guard-Band-clipping shader Thread Constructor) 150 packs and sends the primitive needs to be clipped to the GBS (Guard-Band-clipping Shader) thread, enabling the GBS thread being executed to output the primitive information to the SP 120 and store the clipped results in the GB primitive buffer 170. The ASTC (Attribute Shader Thread Constructor) 160 reads information about primitives from the primitive buffer 110 or GB primitive buffer 170, packs and sends the primitive information to the AS (Attribute Shader) thread, enabling the AS thread being executed to output the primitive information to the SP 120 for executing attribute functions in parallel. The ASTC 160 requests an allocation of memory space to the shared memory 130 for each primitive, enabling the SP 120 to output the computation results to the shared memory 130. The AS thread may further store the computation results in the attribute buffer 180.

Figure 2:
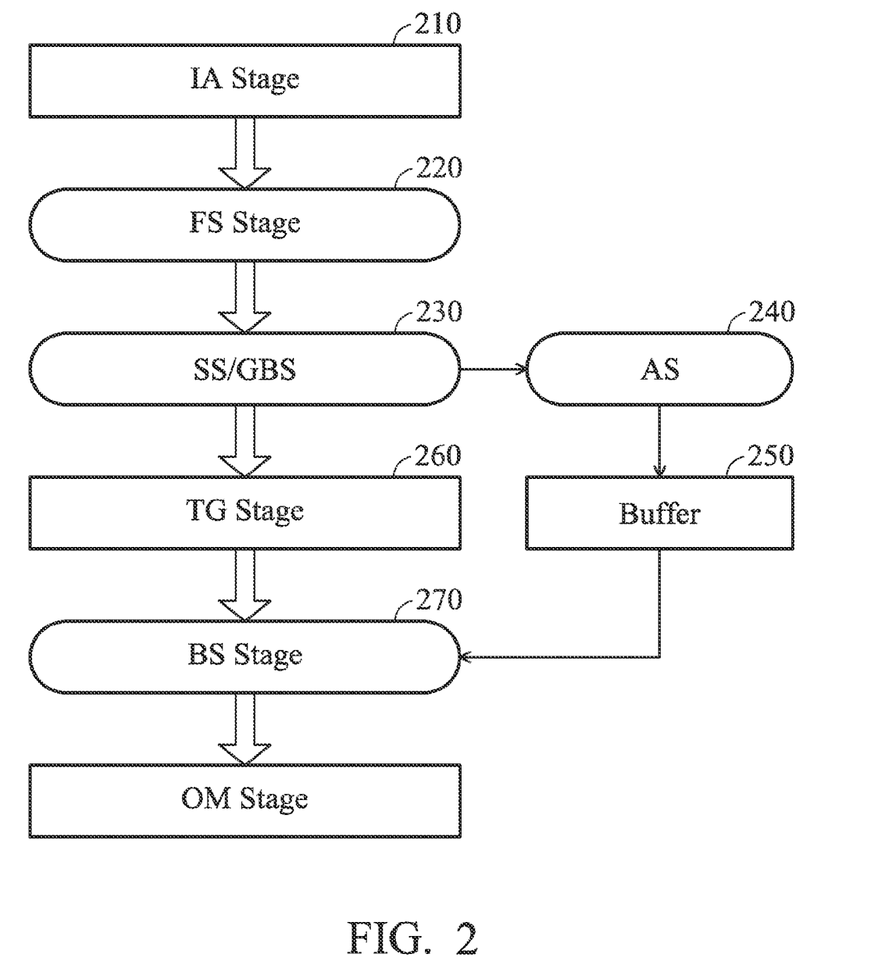
FIG. 2 is a schematic diagram illustrating the primitive setup of the 3D graphics pipeline according to an embodiment of the invention.

FIG. 2 is a schematic diagram illustrating the primitive setup of the 3D graphics pipeline according to an embodiment of the invention. The IA (input assembler) stage 210 may read data from buffers and assemble the data into primitives that will be used by the other pipeline stages. Specifically, the IA stage 210 may assemble vertices into several different primitive types, such as points, lines and/or triangles. The FS (Front Stage) 220 may contain the well-known VS (Vertex Shader), HS (Hull Shader), DS (Domain Shader), GS (Geometry Shader) or any combinations thereof. In the primitive setup, the embodiments introduce several shaders capable of being executed in parallel by the SP 120, which include SS, GBS and AS, instead of the conventional hardware FIX module. The SP 120 may be the SIMD (Single Instruction Multiple Data) processor. The SS 230 provides the capability of constructing the primitive topology. The GBS 230 provides capability of clipping primitives. The AS 240 provides capability of executing the attribute functions for the primitives. In the primitive setup, the gate-count costs can be reduced by implementing the aforementioned functions by shaders, and after the chip is tape-out, newly discovered errors can be connected and new features can be added by modifying program code of the shaders. Drivers may check the primitive types out of the FS 220 and notify compilers to generate relevant shader codes to handle points, lines and/or triangles. Furthermore, the shaders may use the parallel computation ability to handle multiple primitives at one time, so that the performance of primitive setup improves with the increased number of SP units. The number of primitives which can be processed in one hardware thread depends on the capability of SP units, such as 16 or 32 or 64 data are computed once. The computation results by the SS and the GBS 230 are output to the TG (Tile Generation) stage 260. The computation results by the AS 240 are output to the BS (Back Stage) 270. The BS 270 may contain the well-known PS (Pixel Shader).

Figure 3:
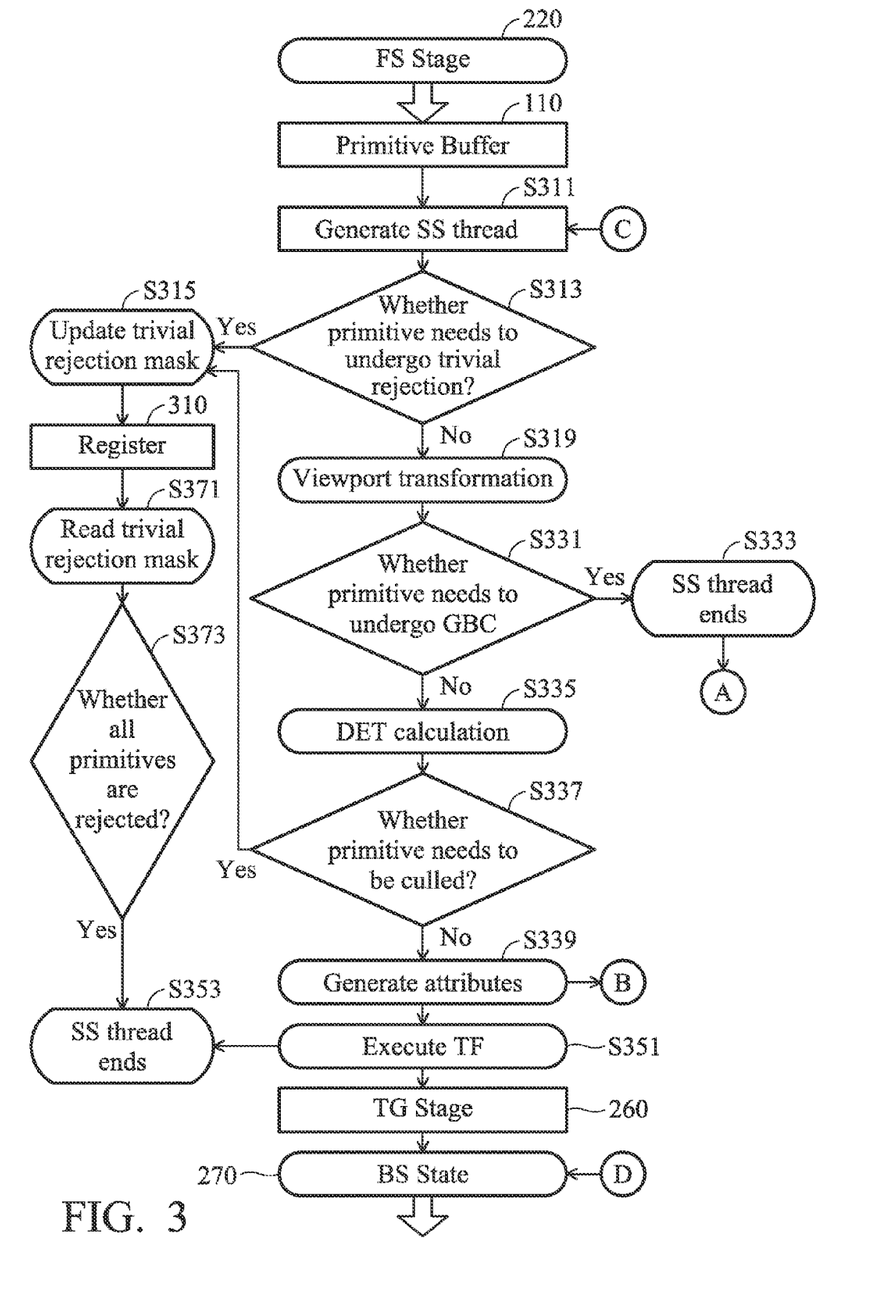
FIG. 3 is a flowchart illustrating the method for programmable primitive setup in 3D graphics pipeline according to an embodiment of the invention.

FIG. 3 is a flowchart illustrating the method for programmable primitive setup in 3D graphics pipeline according to an embodiment of the invention. Results of the FS 220 may be output and stored in the primitive buffer 110. To process a specified number of primitives of the same type, such as 16, 32 or 64 triangles, the compiler instructs the SSTC 140 to generate an SS thread (step S311). The SSTC 140 may be implemented in designated circuits having less gate-count costs than the FIX module. The SSTC 140 may be alternatively implemented in firmware or software code and the SP 120 loads and executes relevant program code of the SSTC 140 to generate the SS thread. The following steps are performed to construct the primitive topology when the SS thread is executed. For each primitive, the SS thread determines whether the primitive needs to undergo the trivial rejection (step S313). The primitives may be obtained from the primitive buffer 110 or the GB primitive buffer 170. In step S313, specifically, the SIMD units of the SP 120 load the primitives of the same type and each SIMD unit determines whether the loaded primitive is entirely out of the display screen. If so, it indicates that the primitive has no need to render and the corresponding bit of the trivial rejection mask is updated (step S315). Otherwise, the primitive is undergone the viewport transformation (step S319). The trivial rejection mask may be implemented in the register 310. In step S315, for example, the trivial rejection mask may contain a designated number of bits and all bits are initially set to logic "0". The $0^{th}$ bit of the trivial rejection mask is set to logic "1" when the $0^{th}$ primitive needs to undergo the trivial rejection. In step S319, the viewport transformation converts the primitive into 2D (two-dimensional) coordinates on the display screen according to relevant information, such as 3D coordinates of the primitive. For the remaining primitives, the SS thread further determines whether the primitive needs to undergo the GBC (Guard-Band Clipping) (step S331). In step S331, specifically, the SIMD units of the SP 120 load the primitives need to be processed and each SIMD unit determines whether the loaded primitive is needed to undergo the GBC. If any, all of the remaining primitives needs to be processed by the GBS 230 and the SS thread ends (step S333). For each remaining primitive, the SS thread performs the DET (DE-Terminant) calculation (step S335). For example, step S335 may calculate determinants for each remaining primitive, such as the dimension of triangle, information indicating that the primitive is located on the correct or opposite side of the display screen, etc. For each remaining primitive, the SS thread further determines whether the primitive needs to be culled (step S337). In step S337, specifically, the SIMD units of the SP 120 load the primitives need to be processed and each SIMD unit determines whether the loaded primitive is located on the opposite side of the display screen. If so, it indicates that the primitive has no need to render and the corresponding bit of the trivial rejection mask is updated (step S315). Otherwise, the attributes required by the AS 240 are generated (step S339). For example, the $10^{th}$ bit of the trivial rejection mask is set to logic "1" when the $10^{th}$ primitive needs to cull. For each remaining primitive, the SS thread executes the TF (Topology Function) and outputs the results to the TG stage 260 (step S351).

The SS thread further periodically reads values of the trivial rejection mask from the register 310 (step S371) and determines whether all primitives are rejected (step S373). If so, the SS thread ends (step S353). In steps S371 and S373, for example, the SS thread determines whether all bits of the trivial rejection mask are logic "1". If so, it indicates that all primitives are rejected and have no need to render.

Figure 4A:
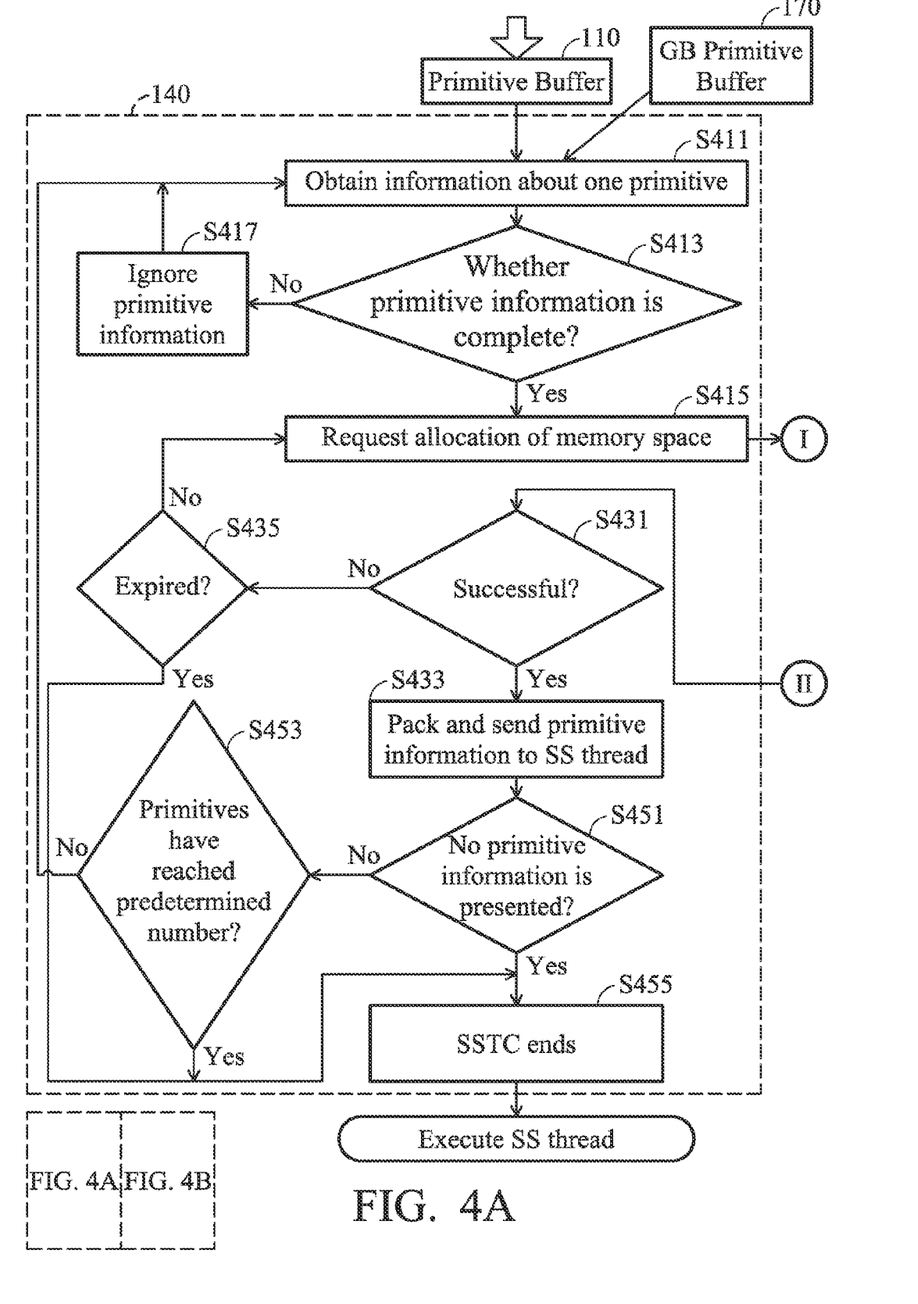
FIGS. 4A and 4B are flowcharts illustrating the method for generating an SS (Setup Shader) thread according to an embodiment of the invention.
Figure 4B:
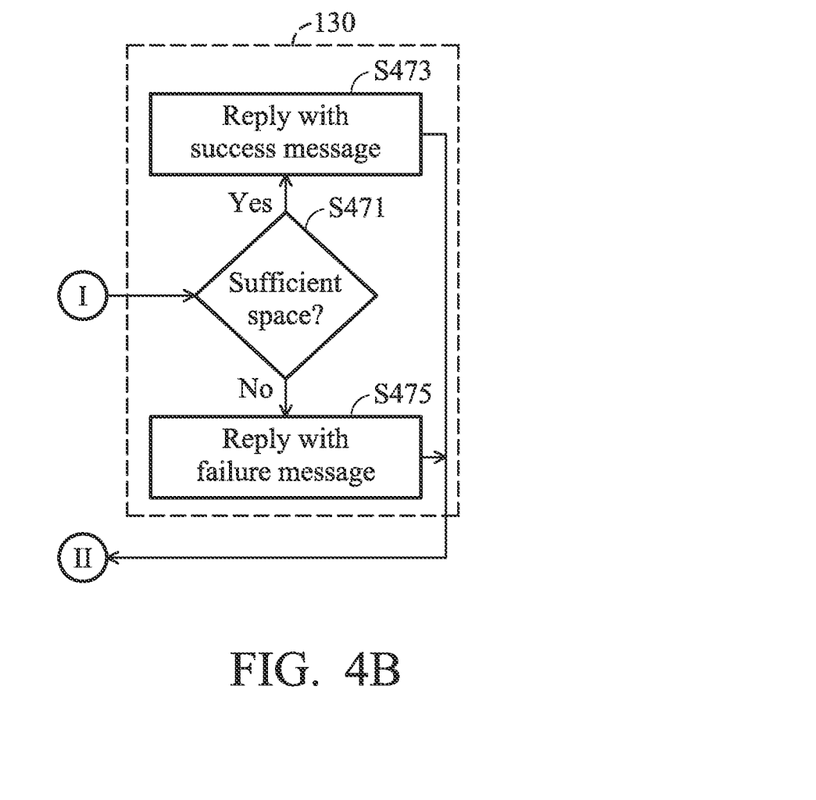

Refer to step S311 of FIG. 3. FIGS. 4A and 4B are flowcharts illustrating the method for generating an SS thread according to an embodiment of the invention. The SSTC 140 periodically executes a loop for obtaining information about one primitive from the primitive buffer 110 or the GB primitive buffer 170 (step S411) and determines whether the primitive information is complete (step S413). If so, the SSTC 140 requests an allocation of memory space to the shared memory 130 (step S415). Otherwise, the primitive information is ignored (step S417). After receiving the request (step S415), the memory controller of the shared memory 130 determines whether the shared memory 130 has sufficient space (step S471). If so, the success message including an address of the allocated space is replied (step S473). Otherwise, the failure message is replied (step S475). After receiving a message from the memory controller, the SSTC 140 determines whether the allocation of memory space is successful (step S431). When the allocation of memory space is successful (the "Yes" path of step S431), the SSTC 140 packs and sends the primitive information to the SS thread (step S433). Otherwise (the "No" path of step S431), the SSTC 140 determines whether the request has expired (step S435). When the request has expired (the "Yes" path of step S435), the SS thread is executed. Otherwise, the SSTC 140 continues to request an allocation of memory space to the shared memory 130 (step S415). Subsequently, when no primitive information is presented in the buffer (the "Yes" path of step S451) or the primitives of the obtained information have reached the predetermined number (the "Yes" path of step S453), the SSTC 140 ends (step S455) and the SS thread is executed. When any further primitive information is presented in the buffer (the "No" path of step S451) and the primitives of the obtained information have not reached the designated number (the "No" path of step S453), the SSTC 140 obtains information about the next primitive from the primitive buffer 110 or the GB primitive buffer 170 (step S411). The SS thread being executed outputs the information about the designated number of primitives to the SP 120 for computing the information in parallel and stores the computation result corresponding to each primitive in the allocated memory space of the shared memory 130.

Figure 5:
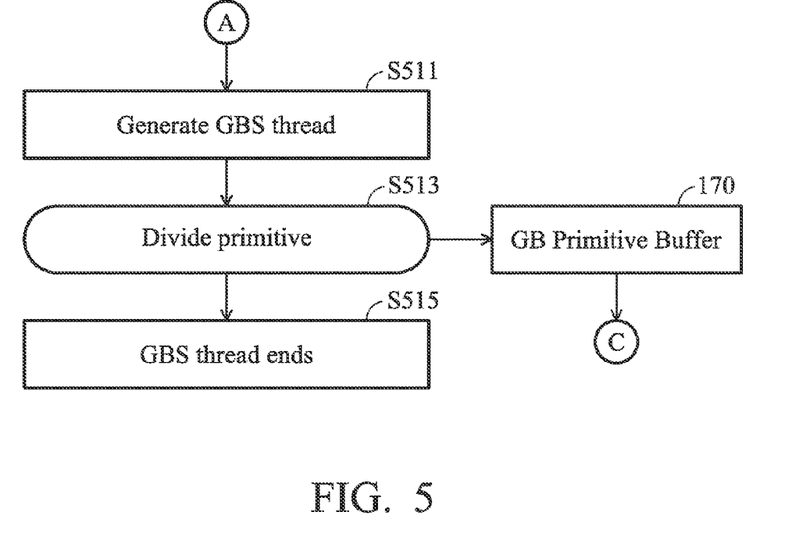
FIG. 5 is a flowchart illustrating the method for programmable primitive setup in 3D graphics pipeline according to an embodiment of the invention.

FIG. 5 is a flowchart illustrating the method for programmable primitive setup in 3D graphics pipeline according to an embodiment of the invention. Following FIG. 3, after the SS thread ends (step S333), the compiler instructs the GBTC 150 to generate a GBS thread (step S511). The GBTC 150 may be implemented in designated circuits having less gate-count costs than the FIX module. The GBTC 150 may be alternatively implemented in firmware or software code and the SP 120 loads and executes relevant program code of the GBTC 150 to generate the GBS thread. The following steps are performed to realize the GBC when the GBS thread is executed. For each primitive that needs to be clipped, the GBS thread divides the primitive into smaller primitives falling within the display screen, for example, dividing one triangle into smaller triangles falling within the display screen, and stores the divided ones in the GB primitive buffer 170 (step S513). Next, the GBS thread ends (step S515).

Figure 6:
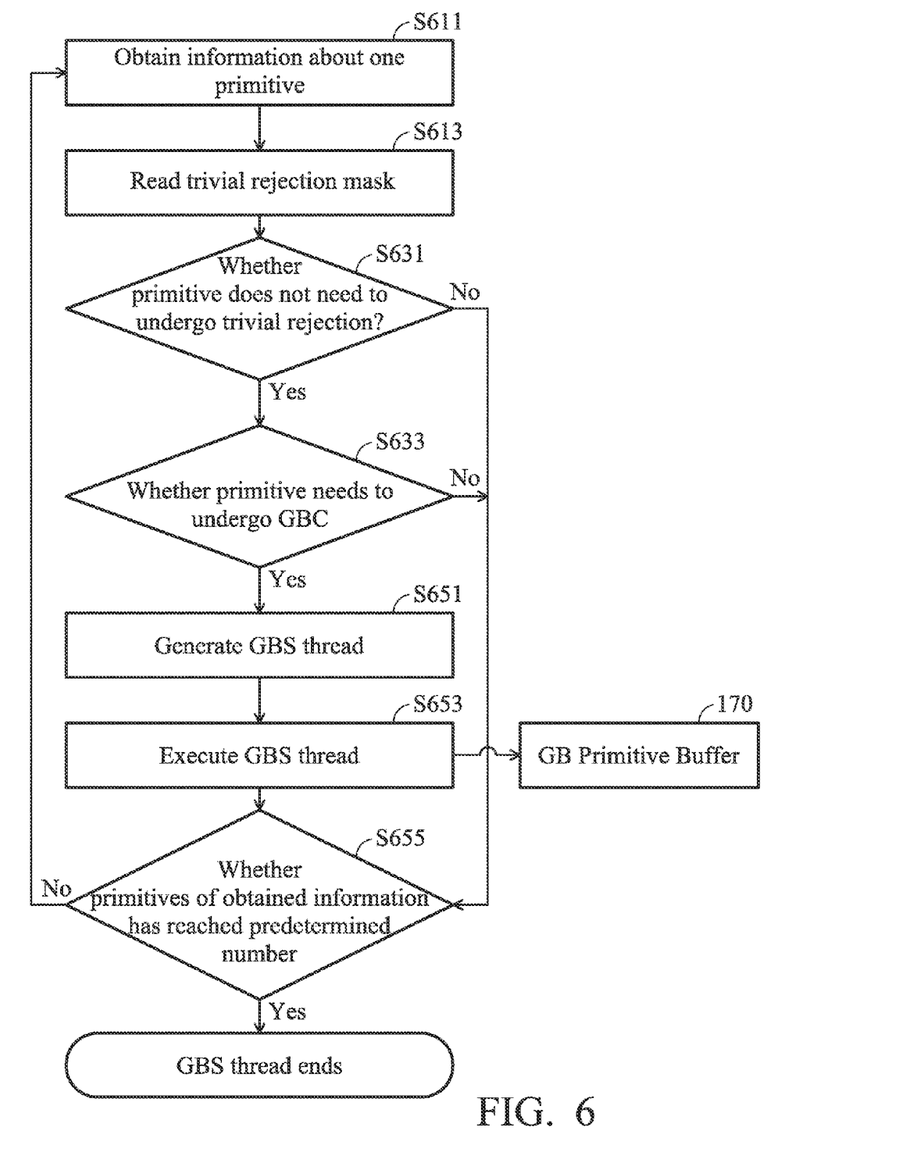
FIG. 6 is a flowchart illustrating the method for generating a GBS (Guard-Band-clipping Shader) thread according to an embodiment of the invention.

Refer to step S511 of FIG. 5. FIG. 6 is a flowchart illustrating the method for generating a GBS thread according to an embodiment of the invention. The GBTC 150 periodically executes a loop for obtaining information about one primitive from the primitive buffer 110 (step S611), reads the content of the trivial rejection mask (step S613) and determines whether the primitive does not need to undergo the trivial rejection according the corresponding bit of the trivial rejection mask (step S631). If so (the "Yes" path of step S631), it is further determined whether the primitive needs to undergo the GBC (step S633). If so (the "Yes" path of step S633), the GBTC 150 generates the GBS thread (step S651) and executes the GBS thread (step S653). The GBS thread being executed divides the primitive into one or more smaller primitives falling within the display screen and stores the divided one(s) in the GB primitive buffer 170. When any of the determinations is "No" (the "No" path of step S631 or the "No" path of step S633), it is determined whether the primitives of the obtained information has reached the predetermined number (step S655). If so, the GBTC 150 obtains information about the next primitive from the primitive buffer 110 (step S611).

Figure 7:
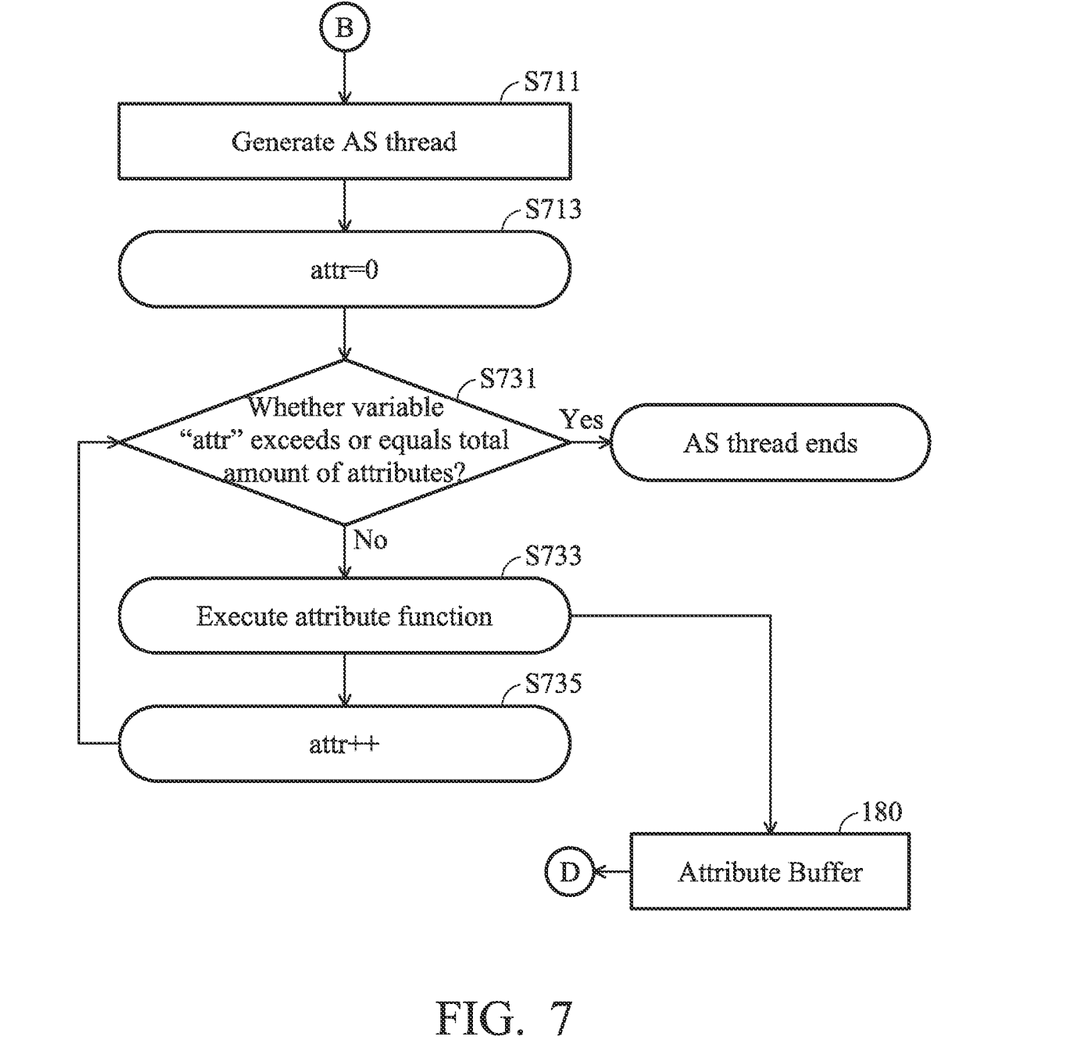
FIG. 7 is a flowchart illustrating the method for programmable primitive setup in 3D graphics pipeline according to an embodiment of the invention.

FIG. 7 is a flowchart illustrating the method for programmable primitive setup in 3D graphics pipeline according to an embodiment of the invention. Following FIG. 3, after the attributes are generated (step S339), the compiler instructs the ASTC 160 to generate an AS thread (step S711) and sets the variable "attr" to 0 (step S713). Next, a loop is repeatedly executed (steps S731 to S735) until the variable "attr" exceeds or equals the total amount of the attributes (the "Yes" path of step S731). In each run, for one attribute (such as, the color, the coordinates, etc.), the AS thread executes the corresponding attribute function, stores the results in the attribute buffer 180 (step S733) and increments the variable "attr" by one, that is, "attr=attr+1" (step S735).

Figure 8A:
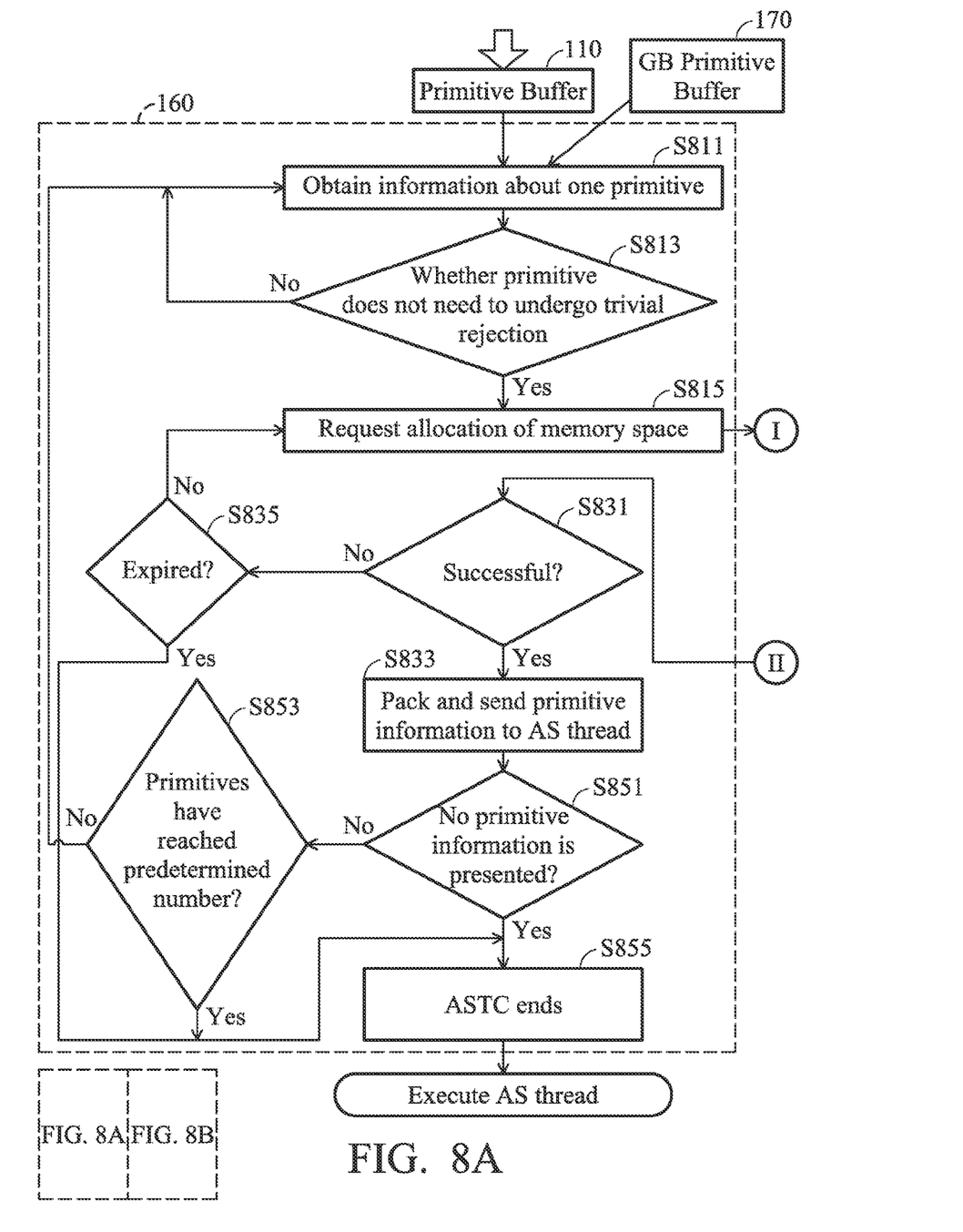
FIGS. 8A and 8B are flowcharts illustrating the method for generating an AS (Attribute Shader) thread according to an embodiment of the invention.
Figure 8B:
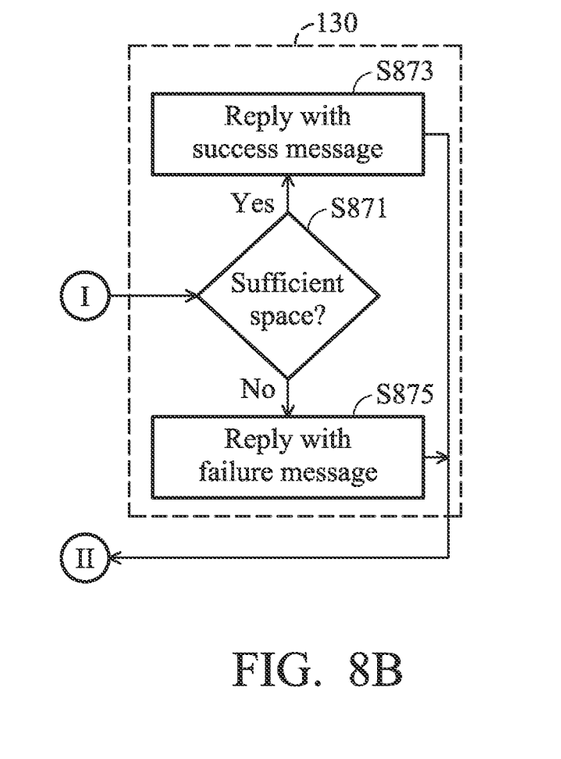

Refer to step S711 of FIG. 7. FIGS. 8A and 8B are flowcharts illustrating the method for generating an AS thread according to an embodiment of the invention. The ASTC 160 periodically executes a loop for obtaining information about one primitive from the primitive buffer 110 or the GB primitive buffer 170 (step S811) and determines whether the primitive does not need to undergo the trivial rejection (step S813). If so, the ASTC 160 requests an allocation of memory space to the shared memory 130 (step S815). Otherwise, information about the next primitive is obtained (step S811). After receiving the request (step S815), the memory controller of the shared memory 130 determines whether the shared memory 130 has sufficient space (step S871). If so, the success message including an address of the allocated space is replied (step S873). Otherwise, the failure message is replied (step S875). After receiving a message from the memory controller, the ASTC 160 determines whether the allocation of memory space is successful (step S831). When the allocation of memory space is successful (the "Yes" path of step S831), the ASTC 160 packs and sends the primitive information to the AS thread (step S833). Otherwise (the "No" path of step S831), the ASTC 160 determines whether the request has expired (step S835). When the request has expired (the "Yes" path of step S835), the AS thread is executed. Otherwise, the ASTC 160 continues to request an allocation of memory space to the shared memory 130 (step S815). Subsequently, when no primitive information is presented (the "Yes" path of step S851) or the primitives of the obtained information have reached the predetermined number (the "Yes" path of step S853), the ASTC 160 ends (step S855) and the AS thread is executed. When any primitive information is presented in the buffer (the "No" path of step S851) and the primitives of the obtained information have not reached the designated number (the "No" path of step S853), the ASTC 160 obtains information about the next primitive from the primitive buffer 110 or the GB primitive buffer 170 (step S811). The AS thread being executed outputs the information about the designated number of primitives to the SP 120 for computing the information in parallel and stores the computation result corresponding to each primitive in the allocated memory space of the shared memory 130.

Although the embodiments have been described in FIG. 1 as having specific elements, it should be noted that additional elements may be included to achieve better performance without departing from the spirit of the invention. While the process flows described in FIGS. 3 to 8 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for a programmable primitive setup in a 3D graphics pipeline, comprising:
    obtaining information about a plurality of first primitives from a buffer;
    packing and sending the information about all or a portion of the first primitives to an SS (Setup Shader) thread, enabling the SS thread being executed to output the information about the first primitives to a SP (Stream Processor) for constructing a primitive topology in parallel;
    packing and sending information about a second primitive to be clipped to a GBS (Guard-Band-clipping Shader) thread, enabling the GBS thread being executed to output the information about the second primitive to the SP for clipping the second primitives;
    obtaining information about third primitives from the buffer;
    packing and sending the information about all or a portion of the third primitives to an AS (Attribute Shader) thread, enabling the AS thread being executed to output the information about the third primitives to the SP for executing an attribute function in parallel;
    obtaining information about the first primitives and determining whether each first primitive is entirely out of a display screen or is located on the opposite side of the display screen, and if so, updating a corresponding bit of a trivial rejection mask to indicate that the first primitive has no need to render when the SS thread is executed;
    periodically reading a plurality of bits of the trivial rejection mask; and
    when the bits of the trivial rejection mask indicate that all the first primitives have no need to render, the SS thread ends.

2. The method of claim 1, wherein the SP is a SIMD (Single Instruction Multiple Data) processor.

3. The method of claim 1, further comprising:
    requesting an allocation of memory space for each of the first and third primitives to a shared memory, enabling the SP to output a computation result to the shared memory.

4. The method of claim 3, wherein the allocation of memory space is requested by a SSTC (Setup Shader Thread Constructor) or an ASTC (Attribute Shader Thread Constructor).

5. The method of claim 4, further comprising:
    when the request for the allocation of memory space has expired, the SSTC or the ASTC ends.

6. The method of claim 1, further comprising:
    determining whether any of the first primitives needs to undergo a GBC (Guard-Band Clipping), and if so, the SS thread ends; and
    when any of the first primitives is not entirely out of the display screen and located on the correct side of the display screen and does not need to undergo the GBC, generating an attribute of the first primitive required by an AS (Attribute Shader) and executing an TF (Topology Function) for the first primitive.

7. The method of claim 6, further comprising:
    dividing the second primitive into one or more smaller primitives falling within the display screen when the GBS thread is executed.

8. The method of claim 7, further comprising:
    executing one or more attribute functions for each third primitive when the AS thread is executed.

9. The method of claim 1, further comprising:
    outputting computation results of the first, second and third primitives to a PS (Pixel Shader).

10. An apparatus for programmable primitive setup in 3D graphics pipeline, comprising:
    a buffer;
    a SP (Stream Processor);
    a SSTC (Setup Shader Thread Constructor) obtaining information about a plurality of first primitives from the buffer, and packing and sending the information about all or a portion of the first primitives to an SS (Setup Shader) thread, enabling the SS thread being executed to output the information about the first primitives to the SP for constructing a primitive topology in parallel;
    a GBTC (Guard-Band-clipping shader Thread Constructor) packing and sending information about a second primitive to be clipped to a GBS (Guard-Band-clipping Shader) thread, enabling the GBS thread being executed to output the information about the second primitive to the SP for clipping the second primitives; and
    an ASTC (Attribute Shader Thread Constructor) obtaining information about third primitives from the buffer, and packing and sending the information about all or a portion of the third primitives to an AS (Attribute Shader) thread, enabling the AS thread being executed to output the information about the third primitives to the SP for executing an attribute function in parallel,
    wherein the SS thread being executed obtains information about the first primitives; determines whether each first primitive is entirely out of a display screen or is located on the opposite side of the display screen; when any of the first primitives is entirely out of the display screen or is located on the opposite side of the display screen, updates a corresponding bit of a trivial rejection mask to indicate that the first primitive has no need to render; periodically reads a plurality of bits of the trivial rejection mask; and, when the bits of the trivial rejection mask indicate that all the first primitives have no need to render, the SS thread ends.

11. The apparatus of claim 10, wherein the SP is a SIMD (Single Instruction Multiple Data) processor.

12. The apparatus of claim 10, wherein the SSTC requests an allocation of memory space for each first primitive to a shared memory, enabling the SP to output a computation result to the shared memory.

13. The apparatus of claim 12, wherein the SSTC ends when the request for the allocation of memory space for any first primitive has expired.

14. The apparatus of claim 10, wherein the ASTC requests an allocation of memory space for each third primitive to a shared memory, enabling the SP to output a computation result to the shared memory.

15. The apparatus of claim 14, wherein the ASTC ends when the request for the allocation of memory space for any third primitive has expired.

16. The apparatus of claim 10, wherein, the SS thread being executed determines whether any of the first primitives needs to undergo a GBC (Guard-Band Clipping), and if so, the SS thread ends; and when any of the first primitives is not entirely out of the display screen and located on the correct side of the display screen and does not need to undergo the GBC, generates an attribute of the first primitive required by an AS (Attribute Shader) and executes an TF (Topology Function) for the first primitive.

17. The apparatus of claim 16, wherein the GBS thread being executed divides the second primitive into one or more smaller primitives falling within the display screen.

18. The apparatus of claim 17, wherein the AS thread being executed executes one or more attribute functions for each third primitive.

* * * * *